US005890295A

United States Patent [19]

Wachtel et al.

[11] Patent Number: 5,890,295

[45] Date of Patent: *Apr. 6, 1999

[54] COMPLEX ACTION CUTTING DEVICE

[76] Inventors: Jeffrey I. Wachtel, 2032 N. Broad St., Lansdale, Pa. 19446; Bruce M. D'Andrade, Professional Prototypes, Salem Industrial Park, Bldg. #4, Rte. 22, P.O. Box 505, Whitehouse Station, N.J. 08889

[ * ] Notice: The portion of the term of this patent subsequent to Aug. 8, 2016, has been disclaimed.

[21] Appl. No.: 987,931

[22] Filed: Dec. 10, 1997

Related U.S. Application Data

[63] Continuation-in-part of Ser. No. 694,163, Aug. 8, 1996, Pat. No. 5,701,672.

[51] Int. Cl.[6] .................................................. B23B 17/00

[52] U.S. Cl. .................................. 30/191; 30/28; 30/186

[58] Field of Search .............................. 30/28, 26, 175, 30/181, 186, 191, 192, 193; 132/75.4, 75.5

[56] References Cited

U.S. PATENT DOCUMENTS

| | | | |
|---|---|---|---|
| 756,056 | 3/1904 | Rorabach . | |
| 762,725 | 6/1904 | Kaufmann | 30/28 |
| 837,473 | 12/1906 | Ihrig . | |
| 1,057,113 | 3/1913 | Bernard | 30/193 |
| 1,163,733 | 12/1915 | Bernard . | |
| 1,300,330 | 4/1919 | Bernard . | |
| 1,363,164 | 12/1920 | Oesterwitz | 30/186 |
| 1,411,785 | 4/1922 | Hoiland . | |
| 2,028,558 | 1/1936 | Nietzel et al. | 30/28 |
| 3,844,032 | 10/1974 | Siegal | 30/28 |
| 4,198,749 | 4/1980 | Nordin . | |
| 4,819,673 | 4/1989 | McMullen | 132/28 |
| 5,701,672 | 12/1997 | Wachtel et al. | 30/28 |

*Primary Examiner*—Hwei-Siu Payer
*Attorney, Agent, or Firm*—Kenneth P. Glynn, Esq.

[57] ABSTRACT

The present invention is a compound action complex pivotal multi-planar cutting device. It is pivotal between four distinct pivot points and it includes a handle portion and a jaw portion which are attached to one another. The jaw portion may be curved or may be bent and terminates in a pair of opposed cutting blades. Thus, when a user holds the handle portion, the blades are displaced a pre-determined number of degrees with respect to the relative curvature or bending of the jaw portion. The handle portion and jaw portion are engaged to one another and are pivotal about two pivot points. The handle portion is preferably a pair of handles that are joined at a third pivot point by a first post member and the jaw portion is preferably a pair of jaw members joined at a fourth pivot point by another post member which is oblique with respect to the first post member.

20 Claims, 5 Drawing Sheets

COMPLEX ACTION CUTTING DEVICE

REFERENCE TO RELATED APPLICATIONS

This is a Continuation-in-Part of patent application Ser. No. 08/694,163, entitled "Complex Action Nail Clippers" and filed on Aug. 8, 1996, now U.S. Pat. No. 5,701,672 by Jeffery I. Wachtel and Bruce M. D'Andrade.

BACKGROUND OF THE INVENTION

1. Field of the Invention

The present invention relates to a pivotal-based cutting device, and more particularly to complex action compound pivot cutting device having a multi-planar pre-molded semi-curved construction.

2. Information Disclosure Statement

The following patents represent several variations on pivotal cutting devices which exemplify the art.

U.S. Pat. No. 756,056 to Ernest Roraback teaches cutting-nippers having a pair of jaws of oblate form in the plane of their meeting surfaces, the plane being obliquely inclined relative to the shank portion when the jaws are closed. The jaws each have a cutting edge located substantially in the plane of the sides and end of the jaws.

U.S. Pat. No. 762,725 to Ernst Kaufmann describes a device for trimming the finger-nails; and it has for its object to provide a construction in which the shanks operating the cutter-blades are extensible. In the closed position the outer portions of said shanks surround the inner portions as well as the blades, and in the position for use said outer portions form a continuation of the inner portions leading directly to the jaws, whereby greater leverage is provided, while the device being readily capable of being folded up can be conveniently carried in the vest-pocket.

U.S. Pat. No. 837,473 to Luther Geo. Ihrig teaches an implement for deadening tobacco plants, comprising members pivotally connected together at an intermediate point in their length and having forward jaws, the inner edges of which are blunt and concave in the direction of their length and also having rear arms, and hand-levers pivotally connected together at their forward ends and pivotally connected at points in rear of their forward ends to the rear ends of the arms of the members. Each of the pivot points are disclosed as extending along axes being parallel to one another.

U.S. Pat. No. 1,057,113 to William A. Bernard describes pliers, nippers or similar tools, which has jaws movable toward and away from each other by means of pivoted handles, and the invention refers particularly to the form of the jaws and the relation of the same to the handles and to the other parts of the tool.

U.S. Pat. No. 1,163,733 to William A. Bernard teaches a clipper having jaws which are gently curved substantially throughout their length, and handle members which are similarly curved to form a continuation of the jaw curve. Each of the pivot points, however, are substantially parallel to one another.

U.S. Pat. No. 1,300,330 to William A. Bernard teaches a pair of lever handles that are preferably constructed of sheet metal, and that have forked forward portions which cross each other, and are pivoted together by means of a pivot pin. The pivot is located intermediate the ends of the crossed handle members, each of which is provided in advance of the parallel portions respectively forming the sides or branches of the forks. Between the parallel portions, a jaw is secured by means of a fastening pin. The pins respectively are both located in advance of the main pivot pin, and are preferably arranged at the forward extremities of the respective handle members, beyond which extremities the jaws extend forward. The cutters are so shaped as to form a sort of bowl so that the stem of an orange or the like can be so cut off as to leave no projection.

U.S. Pat. No. 1,363,164 to Otto H. Oesterwitz, describes certain improvements in finger nail trimmers, and more particularly to the construction of the jaws by which the ends of the nails may be severed. The main object is to provide the jaws with simple and efficient means for cutting the free edges of the nails uniform distances from their junction with the cuticle of the fingers, and at the same time to reduce to a minimum the possibility of cutting into the more sensitive portions of the flesh.

U.S. Pat. No. 1,411,785 to Albert Hoiland teaches a bolt clipper, including operating jaws positioned in the same plane and having a fulcrum point formed on the jaws. It further includes lever ends on the jaws extending from the fulcrum point and cutting ends on the jaws formed out of alinement with the lever ends extending from a point adjacent said fulcrum point.

U.S. Pat. No. 2,028,558 to John A. Nietzel describes a side cutting implement of the double lever box type and especially to an instrument for cutting cuticle and nails.

U.S. Pat. No. 3,844,032 to Jack Siegal describes a double-edged cutting tool which has a spring biased handle and blades forming at least one pair of opposed cutting edges which can be used to perform a cutting operation on an object in a forward or reverse direction without changing the orientation of the handles with respect to the object.

U.S. Pat. No. 4,198,749 to Fred W. Nordin teaches a compound pivot plier-type clipper wherein a pair of handles is pivotally mounted on and between a pair of plates which form a recess for the reception of a selected pair of jaws which are mounted therein by removable means so that a kit can be furnished with a pair of handles and mounting plates and several of the same or different types of pairs of jaws which may be easily substituted, one for the other in the recess between the plates for operation by the handles. The parts are relatively thin so that they may be largely formed by mechanical or hydraulic press stamping operations with resulting low labor costs. A curved jaw is disclosed, but the pivot point for the jaw is parallel to all other pivot points.

U.S. Pat. No. 4,819,673 to Thomas J. McMullen, Jr. teaches a nail clipper which includes a one piece, U-shaped, plastic body having a pair of longitudinal handles with blades on one or both of the longitudinal handles of the device. An integral central arc portion bends when the longitudinal handles are compressed. The blades are aligned to provide a scissors-like interference cut. A receptacle for the nail clippings may also be provided, either between the two handles or, within the lower handle itself, or directly beneath the lower blade. The receptacle may be provided with a pivoting or removable cover. A file surface may also be affixed to the nail clipper.

Notwithstanding the prior art in this field, it is believed that the present invention, which comprises a compound pivot complex action cutting device, as described herein, is neither taught nor rendered obvious.

SUMMARY OF THE INVENTION

The present invention is a compound pivot, complex action multi-planar cutting device. It is pivotal between four distinct pivot points and it includes a handle portion and a jaw portion which are attached to one another. The jaw portion may be curved or angled and terminates in a pair of opposed cutting blades. Thus, when a user holds the handle portion, the blades are displaced a pre-determined number of degrees with respect to the relative curvature or angle of the jaw portion. The handle portion and jaw portion are pivotally engaged to one another and are pivotal about two pivot points. The handle portion is preferably a pair of handles that are joined at a third pivot point by a post member and the jaw portion is preferably a pair of jaw members joined at a fourth pivot point by another post member which is non-parallel to the first post member.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The present invention is a compound action, pivotal complex multi-planar cutting device. It is pivotal between four distinct pivot points and it includes a handle portion and a jaw portion which are attached to one another. The jaw portion may be curved or angled with respect to the handle portion and terminates in a pair of opposed cutting blades. Thus, when a user holds the handle portion, the blades are displaced a pre-determined number of degrees with respect to the relative curvature or angle of the jaw portion. The handle portion and jaw portion are pivotally engaged to one another and are pivotal about two pivot points. The handle portion is preferably a pair of handles that are joined at a third pivot point by a first post member and the jaw portion is preferably a pair of jaw members joined at a fourth pivot point by another post member which is non-parallel to the first post member. What is meant by post member is any variety of pivotally engaging retaining members including but not limited to pins, posts, prongs, rivets, rods, screws, shafts and otherwise.

The present invention cutting device may be comprised of pre-molded individual plastic pieces, pre-forged metal pieces and any other suitable material known to be used in the art. It is to be understood that the present invention cutting device may also comprise any number of sizes without exceeding the scope of the present invention.

Figure 3:
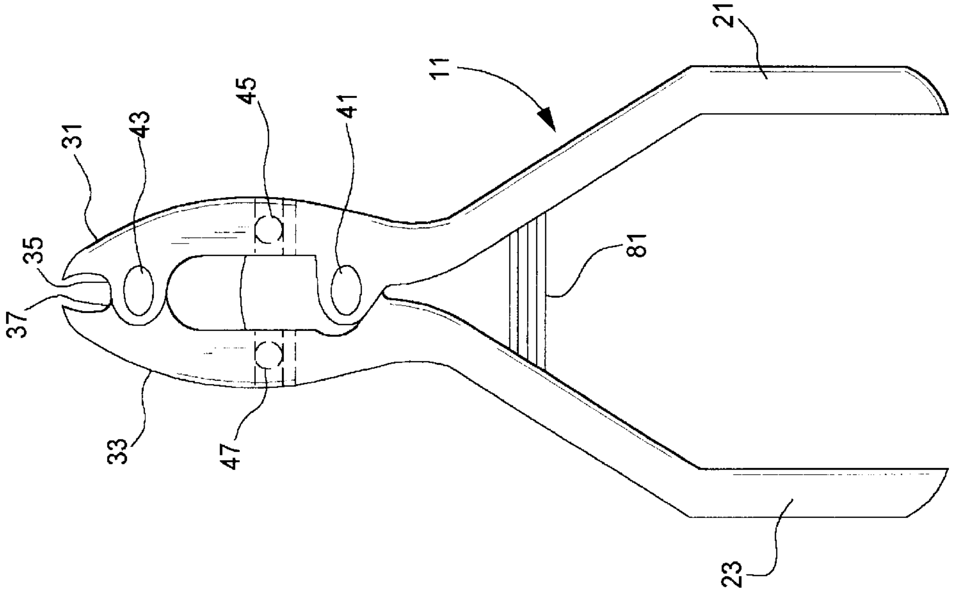
FIG. 3 shows a top view of a present invention complex action compound pivot cutting device shown in FIGS. 1 and 2.
Figure 1:
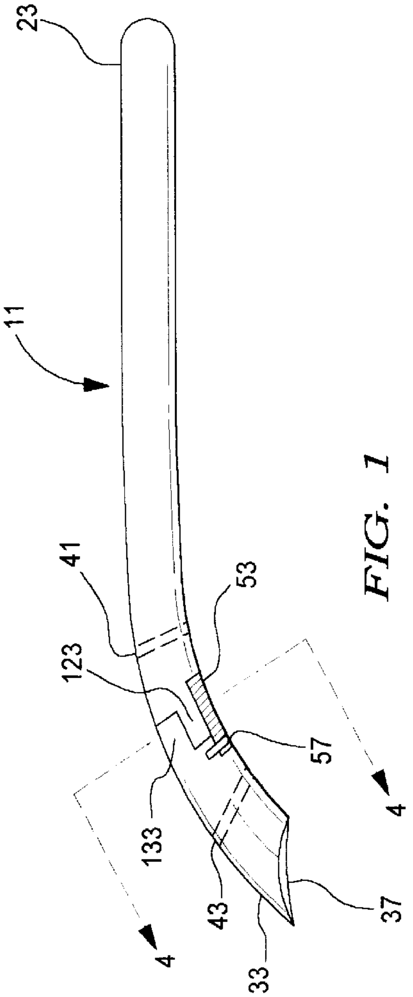
FIG. 1 shows a side view of a present invention complex action compound pivot cutting device.
Figure 2:
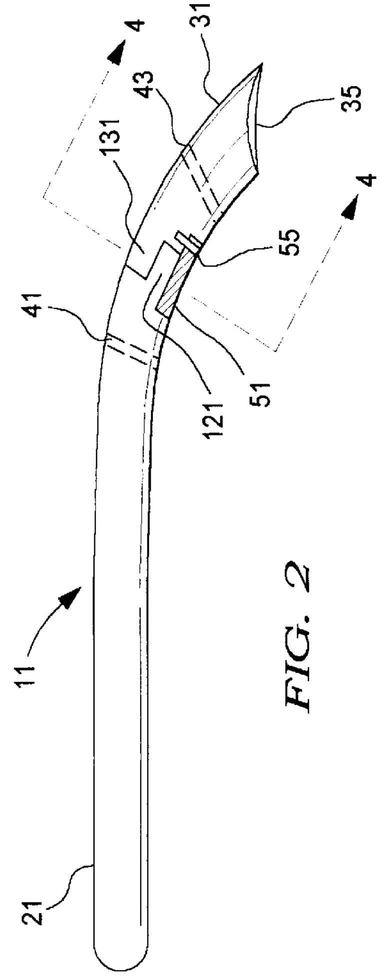
FIG. 2 shows a side view of a present invention complex action compound pivot cutting device shown in FIG. 1.

FIGS. 1 and 2 show side views of a present invention compound action complex pivotal cutting device and FIG. 3 shows a top view of a present invention complex action compound pivot cutting device, as shown in FIGS. 1 and 2. Referring to FIGS. 1 through 3, cutting device 11 has handle members 21 and 23 which are pivotally joined by post member 41. Handle member 21 has extension 121 and handle member 23 has extension 123, each of which are joined with extensions 131 and 133 of jaw members 31 and 33 respectively. Extensions 121 and 131 are shown being clamped together by clamp member 51 which is retained by screw member 55. Extensions 123 and 133 are shown being clamped together by clamp member 53 which is retained by screw member 57. Extensions 121 and 131 are pivotally engaged to one another by pivot means 45. Extensions 123 and 133 are pivotally engaged to one another by pivot means 47. Pivot means 45 and 47 are described in detail below with respect to FIGS. 4 through 7.

As shown in FIGS. 1 and 2, jaw members 31 and 33 are curved and are pivotally joined by post member 43, which is non-parallel, or more specifically, oblique with respect to post member 41. Thus, the curvature of jaw members 31 and 33 with respect to handle members 21 and 23 is critical to the present invention because of the oblique compound pivot construction. Jaw members 31 and 33 terminate in opposed cutting blades 35 and 37 which engage one another when handle members 21 and 23 are biased inwardly by a user. Here, compression spring 81 is maintained between handle members 21 and 23, thereby biasing handle members 21 and 23 outwardly and preventing cutting blades 35 and 37 from freely engaging one another. Thus, a user must bias handle members 21 and 23 inwardly in order to engage cutting blades 35 and 37 so as to cut wires, strips or the like. While FIGS. 1 through 3 disclose a compression spring as a biasing means any alternative biasing member may be employed as a biasing means. In other words, compression spring 81 is merely illustrative and any other biasing means may be employed. Additionally, the cutting device may not even comprise a biasing means at all. Thus, the compound oblique pivot point embodiment provides a more useful and conducive instrument for users with ailments such as arthritis than other cutting devices presently available in the art.

The curved construction of cutting device 11 allows a user to grasp handle members 21 and 23 with either hand and to clip a wire or the like without any awkward positioning of the cutting device and without any excessive effort. Specifically, handle members 21 and 23 are held generally perpendicular a toe and the curvature of jaw members 31 and 33 permit cutting blades 35 and 37 to be parallel to and flush with the tip of a toenail or the like. The pre-selected degree of curvature of the jaw members will alter the positioning of the handle members with respect to a user's toe. Thus, it is to be understood that the pre-selected curvature and the exact contours of jaw members 31 and 33 may vary slightly in degree without exceeding the scope of the present invention, i.e. a 45° to 90° curve. Likewise, the handle portion which comprises a generally linear portion may also have a curved portion which operates with a curved jaw portion.

Figure 4:
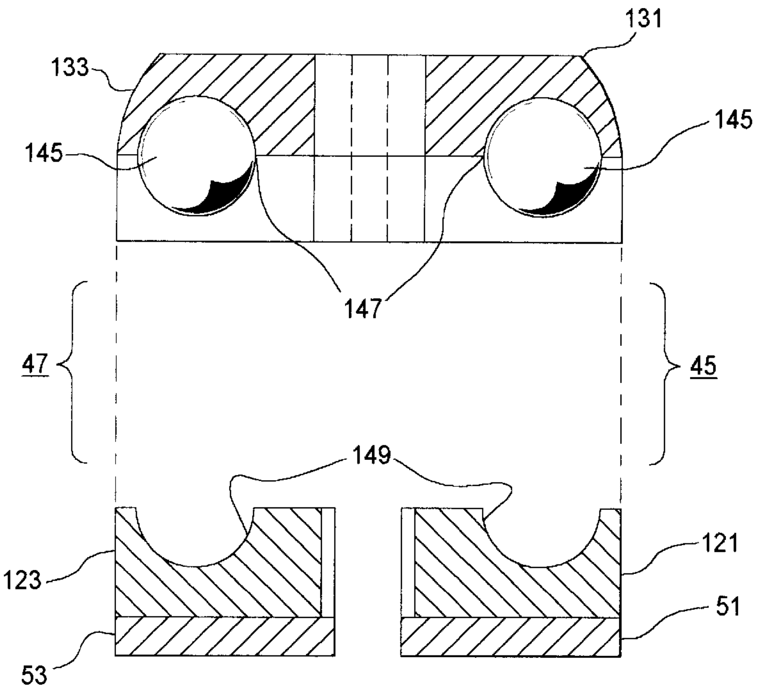
FIG. 4 shows a partial cut rear side view of a present invention complex action compound pivot cutting device illustrated in FIGS. 1 through 3 above, showing details of pivot points between the handle portion and the curved jaw portion.
Figure 5:
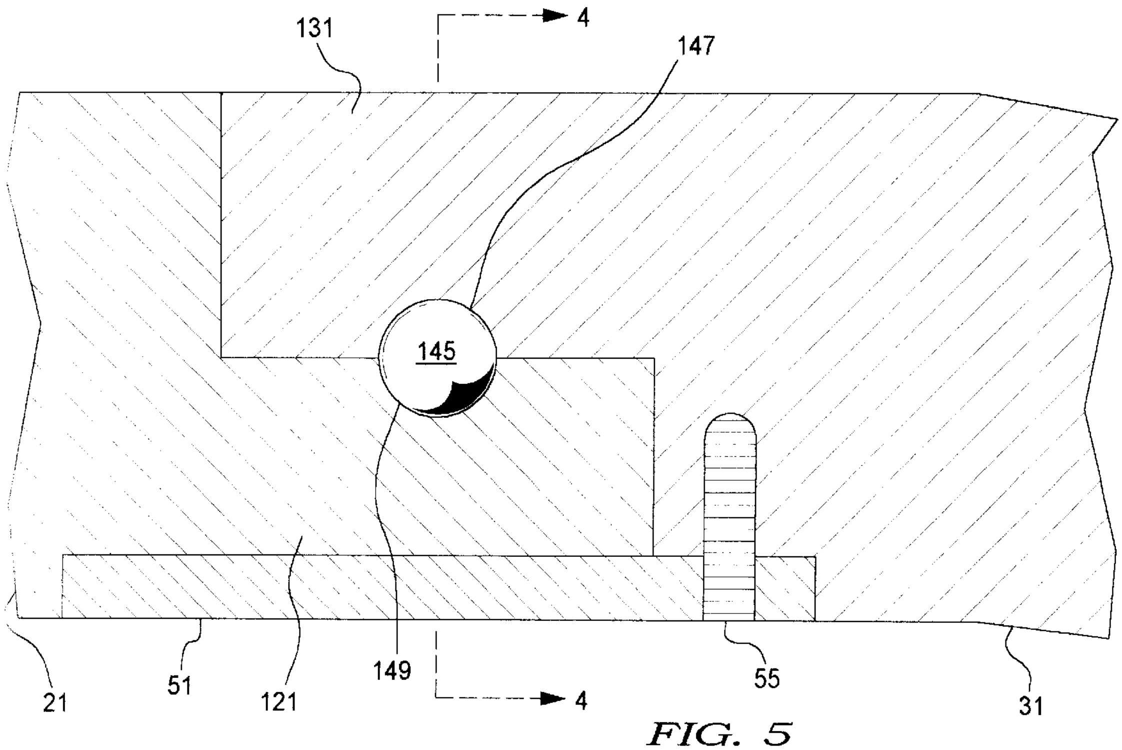
FIG. 5 shows a partial cut side view of a present invention complex action compound pivot cutting device, illustrating details of pivot points between the handle portion and the curved jaw portion as shown in FIG. 4.

FIG. 4 shows a partial cut rear side view of a present invention complex action compound pivot cutting device, illustrating details of pivot means 45 and 47 which are defined within extensions 121, 123, 131 and 133 as shown in FIGS. 1 through 3. FIG. 5 shows a partial cut side view of extensions 121 and 131 as shown in FIG. 4. Referring to FIGS. 4 and 5, pivot means 45 and 47 are a pair of ball and socket joints which are clamped together by clamps 51 and 53. As shown, each ball and socket joint includes a ball bearing 145 and a pair of opposed sockets 147 and 149. When extensions 121, 131, 123 and 133 are clamped together by clamps 51 and 53, the ball bearings are retained in place between the opposed sockets, thereby creating a pair of pivot points. The ample degree of pivotal freedom permits each ball and socket joint to function concurrently with post members 41 and 43, thus forming a compound pivot complex action arrangement of four pivot points. While pivot means 45 and 47 are shown as being a pair of ball and socket joints, it is to be understood that pivot means 45 and 47 may alternatively include a pair of universal joints, a plurality of ball bearing members, free floating balls and other like components without exceeding the scope of the present invention. In other words, it is not critical to the functionality of the present invention that pivot means 45 and 47 be limited to one specific embodiment. Additionally, the handle extension and jaw extension with accompanying clamp version of the present invention may by substituted with cut-out portions and complimentary inserted portions, such as force fitted members, without exceeding the scope of the present invention, as is discussed in detail below with respect to FIGS. 6 and 7.

Figure 6:
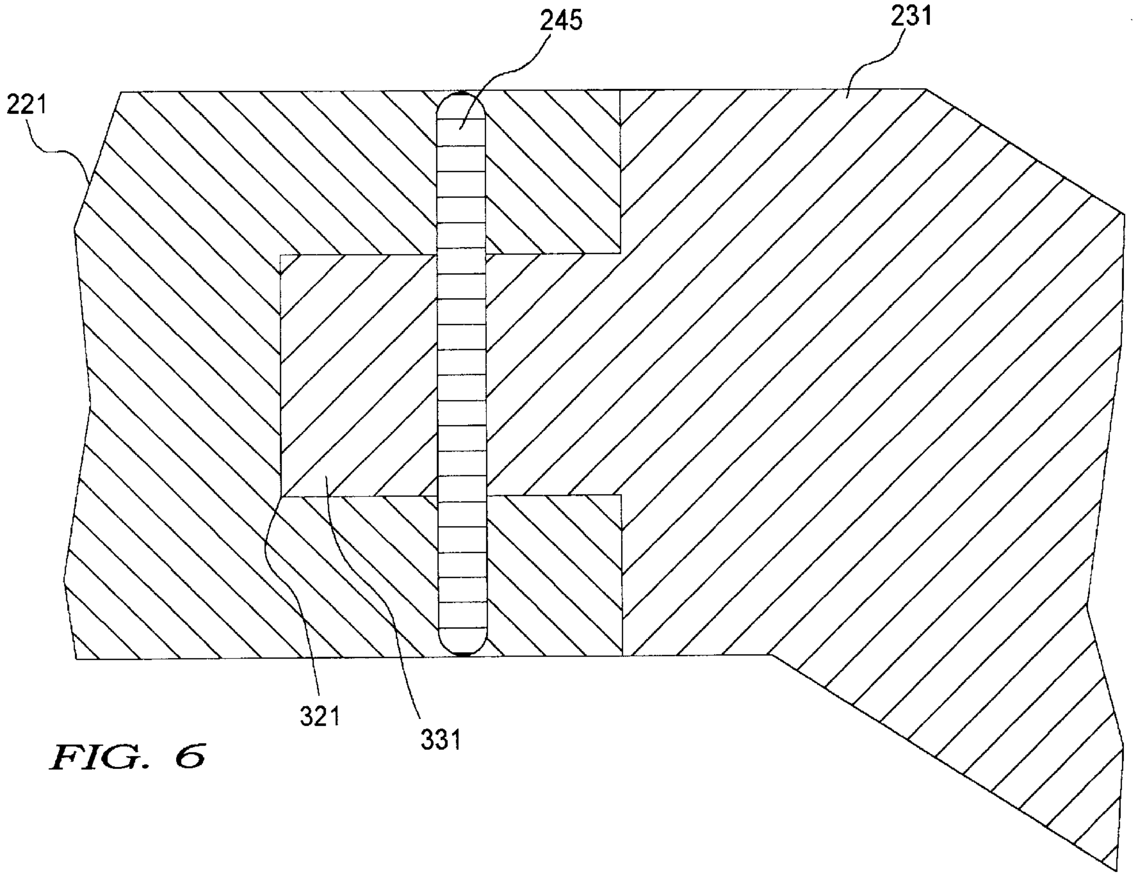
FIG. 6 shows a partial cut side view of an alternative embodiment present invention complex action compound pivot cutting device, illustrating details of pivot points between the handle portion and the curved jaw portion; and, FIG. 7 shows a partial cut side view of another alternative embodiment present invention complex action compound pivot cutting device, illustrating details of pivot points between the handle portion and the curved jaw portion.

FIG. 6 shows a partial cut side view of an alternative embodiment present invention compound action complex pivotal cutting device, illustrating details of an alternative pivot means between an alternative handle member and jaw member. Here, handle member 221 comprises cut-out 321 which has adequate size and dimension to envelop extended portion 331 of jaw member 231. Post member 245 permits cut-out 321 and extended portion 331 to be pivotally engaged. Thus, no clamp is needed in such an alternative embodiment.

Figure 7:
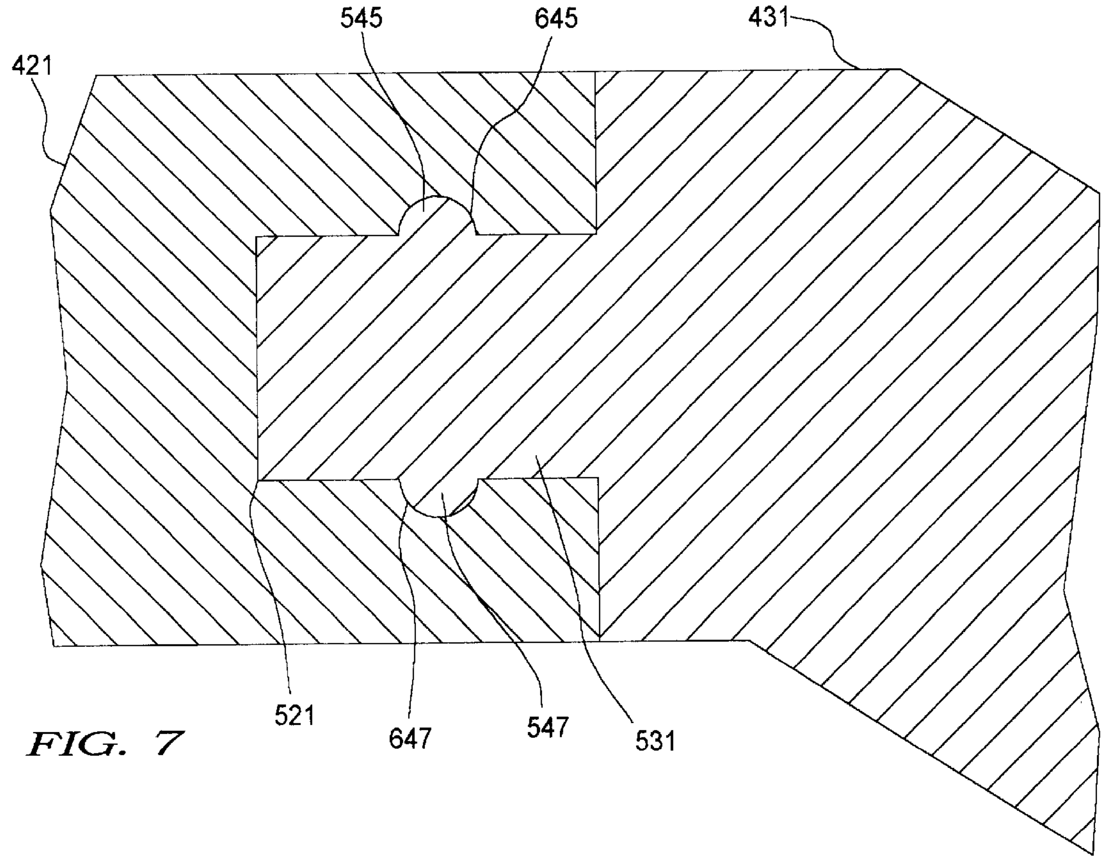

FIG. 7 shows a partial cut side view of another alternative embodiment present invention compound action complex pivotal cutting device, illustrating details of another alternative pivot means between another alternative handle member and another alternative jaw member. Here, handle member 421 comprises cut-out 521 which has adequate size and dimension to envelop extended portion 531 of jaw member 431. Protruding beads 545 and 547 are located on extended portion 531 opposite one another and are adequately sized to snap into impressions 645 and 647 which are defined within cut-out 521. As shown, the protruding beads and impression function as a pivot point once extended portion 531 has been force fitted into cut-out 521. It is not essential, however, that either a handle member or a jaw member comprise a cut-out or a force fitted extension. It is therefore to be understood that a jaw member may comprise a cut-out and a handle member may comprise an extended portion without exceeding the scope of the present invention. It is to be understood further that the force fitted embodiments disclosed in FIGS. 6 and 7 are merely illustrative and that other similar force fitted constructions are to be included within the scope of the present invention, i.e. force fitted members that have a ball and socket joint therein.

Figure 8:
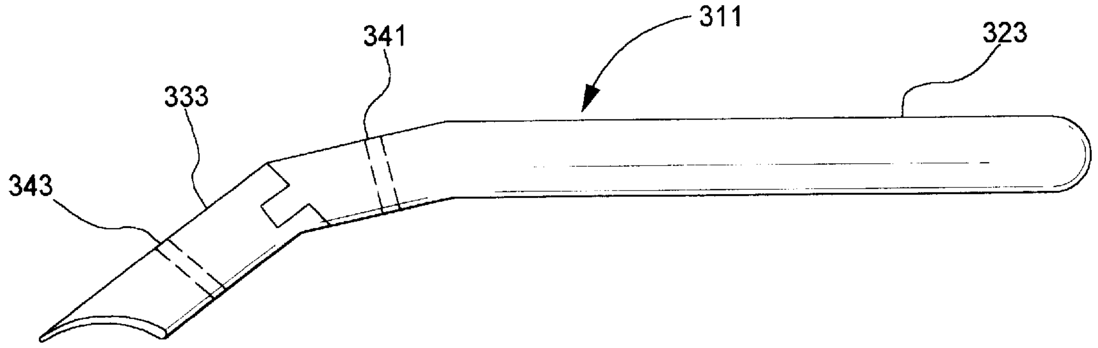
FIGS. 8 and 9 show other alternative embodiment present invention complex action compound pivot cutting devices having a straight sectioned two angled design and a straight sectioned single angled design, respectively; and, FIGS. 10 and 11 illustrate graphically the oblique relationships between the post members and the opposing cutting blades of two different present invention cutting devices.
Figure 9:
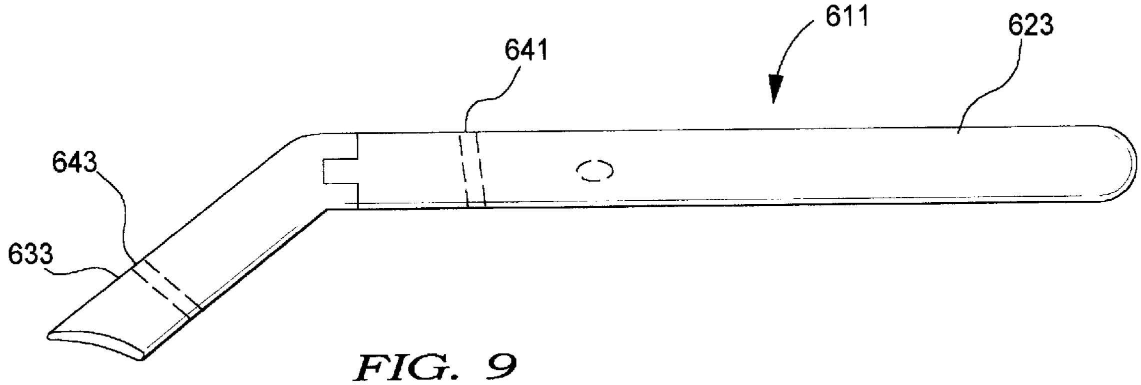

FIGS. 8 and 9 show side views of alternative embodiments of a present invention compound cutting device. Referring to FIG. 8, alternative embodiment compound cutting device 311 has handle member 323, which has a generally linear portion and an angled portion. Handle member 323 is joined with handle member (not shown) at a pivot point by a post member 341. Jaw member 333 is connected to handle member 323 and is linear instead of curved. Jaw member 333 is joined with jaw member (not shown) at a pivot point by post member 343, which is oblique with respect to post member 341. Thus, alternative embodiment compound cutting device 311 functions identically as a curved embodiment, but comprises a plurality of linear portions which are angled with respect to one another. The oblique correlation of pivot points 341 and 343 is analogous to a curved embodiment compound action cutting device.

Referring to FIG. 9, alternative embodiment compound cutting device 611 has handle member 623, which is linear in its entirety. Handle member 623 is joined with handle member (not shown) at a pivot point by a post member 641. Jaw member 633 is connected to handle member 623 and is angled instead of curved throughout. Jaw member 633 is joined with jaw member (not shown) at a pivot point by post member 643, which is oblique with respect to post member 641. Thus, alternative embodiment compound cutting device 611 functions identically as a curved embodiment, but comprises a linear handle portion and an angled jaw portion, which is angled with respect to the handle portion. The oblique correlation of pivot points 641 and 643 is also analogous to a curved embodiment compound action cutting device comprising like oblique pivot points.

Figure 10:
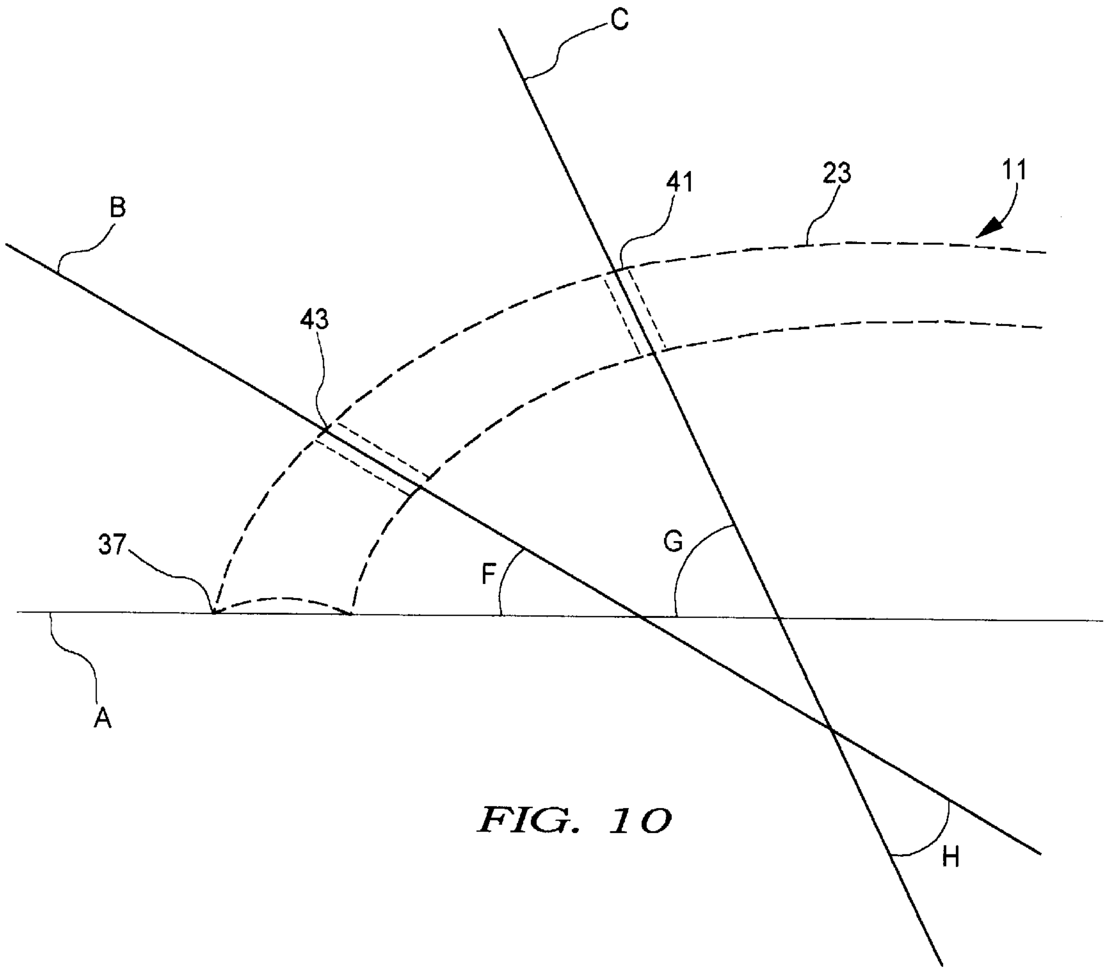

FIG. 10 shows a partial side view of a dotted line overlay of a present invention cutting device 11, as shown in FIGS. 1 through 3, illustrating details of the oblique relationship between post members and the opposed cutting blades. As shown, post member 41 is obliquely positioned with respect to post member 43. Line A represents a plane defined by the terminal ends of blade 37 and 35 (not shown). Line B defines the axis of post member 43 and line C defines the axis of post member 41. The oblique angle H accordingly represents the degree of oblique displacement between the axes of post member 41 and 43. It is preferable to define angle H between about 20° and about 50°, but most preferably about 25° and 45° and especially about 35° and about 45°. The oblique angle G represents the degree of oblique displacement between the axis of post member 41 and the plane defined by the terminal ends of cutting blades 35 and 37. It is preferable to define angle G between 40° and 65°, but most preferably about 65°. The oblique angle F represents the degree of oblique displacement between the axis of post member 43 and the plane defined by the terminal ends of cutting blades 35 and 37. It is preferable to define angle F between 15° and 30°, but most preferably about 30°. Thus, the present invention compound complex pivotal structure offers a distinctive clipping profile with respect to the oblique pivot arrangement.

Figure 11:
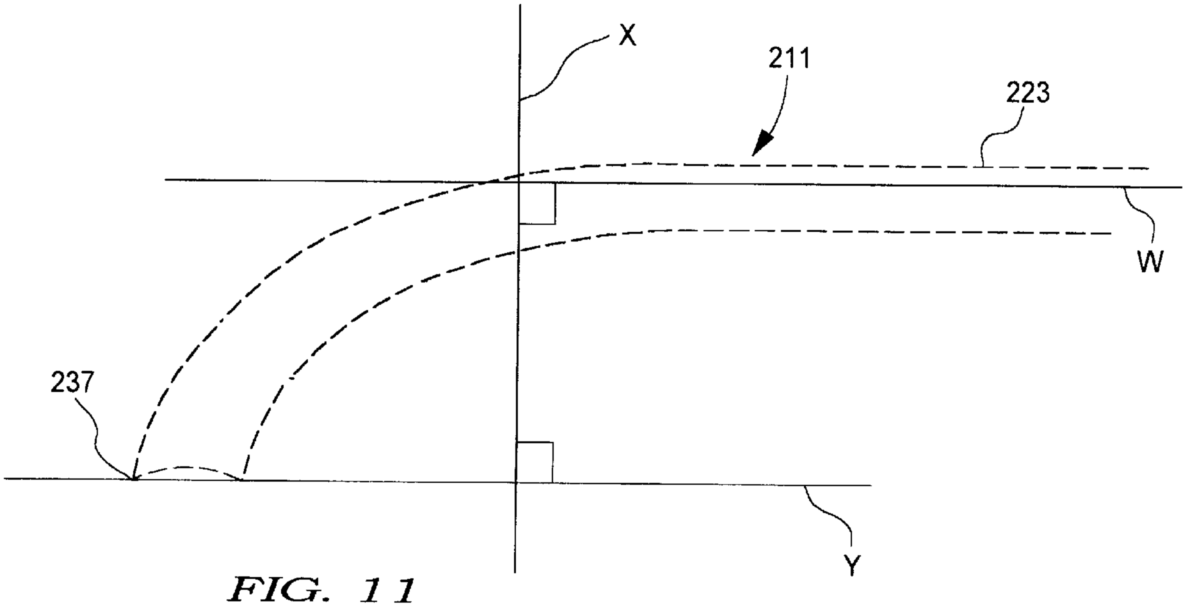

FIG. 11 shows a partial side view of a dotted line overlay of an alternative embodiment present invention cutting device 211, illustrating details of the displacement of the opposed cutting blades with respect to the handle portion. Here, compound cutting device 211 has handle members 223 and 221 (not shown) which have a linear portion defined by line W. Opposed cutting blade 237 and its opposite cutting blade (not shown) terminate at and extend along a plane defined by line Y. Specifically, the terminal ends of opposed cutting blades 235 and 237 delineate line Y. Line X is an illustrative perpendicular line which illustrates the parallel bi-planar relationship between opposed cutting blades 235 and 237 and handles 221 and 223 in such an embodiment.

Obviously, numerous modifications and variations of the present invention are possible in light of the above teachings. It is therefore understood that within the scope of the appended claims, the invention may be practiced otherwise than as specifically described herein.

What is claimed is:

1. A compound action complex pivotal cutting device comprising:

(a) a handle portion, said handle portion comprising a first handle member and a second handle member, said first and second handle members being joined at a first pivot point by a first post member, said post member extending along a rotary axis;

(b) a jaw portion, said jaw portion comprising a first jaw member and a second jaw member, said first jaw member and said second jaw member each having a first end and a second end, said first jaw member and said second jaw member being joined at a second pivot point by a second post member being located between said first jaw member and second jaw member ends, said second post member extending along a rotary axis being oblique with respect to said first post member rotary axis, said first jaw member first end and said second jaw member first end defining a pair of opposed cutting blades;

(c) means for pivotally connecting said first jaw member with said first handle member such that a third pivot point is defined and for pivotally connecting said second jaw member with said second handle member such that a fourth pivot point is defined.

2. The compound action cutting device of claim 1 wherein said first and second jaw members are curved.

3. The compound action cutting device of claim 1 wherein said first and second jaw members are angled with respect to said handle portion.

4. The compound action cutting device of claim 1 wherein said pivotally connecting means are a plurality of force fitted connecting members, said force fitted connecting members being defined on a portion of each of said jaw members and on a portion of each of said handle members.

5. The compound action cutting device of claim 4 wherein said pivotally connecting means include a first ball and socket joint and a second ball and socket joint, each of said first ball and socket joint and said second ball and socket joint including a pair of opposed sockets and a ball bearing, said opposed sockets being defined within opposing surfaces of said force fitted connecting members, said first and second ball and socket joints being clamped together by said force fitted connecting members.

6. The compound action cutting device of claim 4 wherein said pivotally connecting means comprise at least two post members extending along parallel rotary axes.

7. The compound action cutting device of claim 4 wherein said pivotally connecting means comprise a plurality of bead-shaped protrusions and communicating impressions.

8. The compound action cutting device of claim 1 wherein said cutting device comprises means for biasing said handle members outwardly, said biasing means being extended between said first and second handle members, said biasing means biasing said handle members outwardly with respect to one another such that said compound action cutting device is retained in an open position.

9. The compound action cutting device of claim 8 wherein said biasing means is a compression spring.

10. A compound action complex pivotal cutting device comprising:

(a) a handle portion, said handle portion comprising a first handle member and a second handle member, said first and second handle members being joined at a first pivot point by a first post member, said post member extending along a rotary axis, each of said handle members having a first end and a second end, each of said handle members having a substantially linear portion;

(b) a jaw portion, said jaw portion comprising a first jaw member and a second jaw member, said first jaw member and said second jaw member each having a first end and a second end, said first and second jaw members being joined at a second pivot point by a second post member being located between said first and second jaw member ends, said second post member extending along a rotary axis being oblique with respect to said first post member rotary axis, said first jaw member first end and said second jaw member first end defining a pair of opposed cutting blades, said cutting blades extending along a plane being parallel with said linear portion of said handle members;

(c) means for pivotally connecting said first jaw member with said first handle member such that a third pivot point is defined and for pivotally connecting said second jaw member with said second handle member such that a fourth pivot point is defined.

11. The compound action cutting device of claim 10 wherein said first and second jaw members are curved.

12. The compound action cutting device of claim 10 wherein said first and second jaw members are angled with respect to said handle portion.

13. The compound action cutting device of claim 10 wherein said first post member axis and said second post member axis are obliquely positioned at an angle between 20° and 50° with respect to one another and said first post member axis is obliquely positioned at an angle between 40° and 65° with respect to said plane defined by said cutting blades.

14. The compound action cutting device of claim 13 wherein said obliquely positioned first post member axis and second post member axis is at an angle between 25° and 45° with respect to one another.

15. A compound action complex pivotal cutting device comprising:

(a) a handle portion, said handle portion comprising a first handle member and a second handle member, said first and second handle members being joined at a first pivot point by a first post member, said post member extending along a rotary axis, each of said handle members having a first end and a second end;

(b) a jaw portion, said jaw portion comprising a first jaw member and a second jaw member, said first jaw member and said second jaw member each having a first end and a second end, said first and second jaw members being joined at a second pivot point by a second post member being located between said first and second jaw member ends, said second post member extending along a rotary axis being oblique with respect to said first post member rotary axis such that said second post member axis is obliquely positioned between 25° and 45° with respect to said first post member axis, said first jaw member first end and said second jaw member first end defining a pair of opposed cutting blades, said cutting blades extending along a plane such that said first post member axis is obliquely positioned between 40° and 65° with respect to said plane defined by said cutting blades; and, (c) means for pivotally connecting said first jaw member with said first handle member and for pivotally connecting said second jaw member with said second handle member such that a third pivot point and a fourth pivot point are defined.

16. The compound action cutting device of claim 15 having pivotally connecting means wherein:

(a) said first handle member first end includes a first handle extension segment, said first handle extension segment having an upper surface and a lower surface opposite said upper surface;

(b) said second handle member first end includes a second handle extension segment, said second handle extension segment having an upper surface and a lower surface opposite said upper surface;

(c) said first jaw member second end includes a first jaw extension segment, said first jaw extension segment having an upper surface and a lower surface opposite said upper surface;

(d) said second jaw member second end includes a second jaw extension segment, said second jaw extension segment having an upper surface and a lower surface opposite said upper surface; and, (e) said compound action cutting device includes a first clamp plate and a second clamp plate, said first clamp plate joining said first handle extension segment to said first jaw extension segment, said first clamp plate being retained by a post member, said second clamp plate joining said second handle extension segment to said second jaw extension segment, said second clamp plate being retained by a post member.

17. The compound action cutting device of claim 16 including first and second ball and socket joints, said first ball and socket joint being defined by a pair of opposed sockets and a ball bearing, said opposed sockets being defined within said first jaw extension segment lower surface and said first handle extension segment upper surface, said second ball and socket joint being defined by a pair of opposed sockets and a ball bearing, said opposed sockets being defined within said second jaw extension segment lower surface and said second handle extension segment upper surface, said first and second ball and socket joints being clamped together by said first clamp plate and said second clamp plate.

18. The compound action cutting device of claim 15 wherein said cutting device comprises means for biasing said handle members outwardly, said biasing means being extended between said first and second handle member, said biasing means biasing said handle members outwardly with respect to one another such that said compound action cutting device is retained in an open position.

19. The compound action cutting device of claim 18 wherein said biasing means is a compression spring.

20. The compound action cutting device of claim 15 wherein said first and second jaw members are curved.

* * * * *